United States Patent [19]

Gulley

[11] Patent Number: 4,846,655
[45] Date of Patent: Jul. 11, 1989

[54] SPIKE FOR LAWN EDGING OR THE LIKE
[75] Inventor: John Q. Gulley, Farragut, Tenn.
[73] Assignee: Vinylex Corporation, Knoxville, Tenn.
[21] Appl. No.: 203,002
[22] Filed: Jun. 6, 1988
[51] Int. Cl.$^4$ .......................... F16B 15/08; A01G 1/00
[52] U.S. Cl. ..................................... 411/453; 411/455; 411/922; 47/33
[58] Field of Search ............... 411/452, 453, 454, 455, 411/487, 922, 908; 47/33

[56] References Cited

U.S. PATENT DOCUMENTS

| 2,182 | 7/1841 | Ballard . | |
|---|---|---|---|
| 391,109 | 10/1888 | Bellanger . | |
| 1,490,722 | 4/1924 | Bacon . | |
| 2,154,966 | 4/1939 | Vanderveer | 411/452 |
| 2,269,708 | 1/1942 | Dickson | 411/453 |
| 2,293,743 | 8/1942 | Miles et al. | 20/4 |
| 2,780,128 | 2/1957 | Rapata . | |
| 3,214,875 | 11/1965 | Slowinski et al. | 52/364 |
| 3,387,786 | 6/1968 | Rynberk | 47/33 |
| 3,483,787 | 12/1969 | Saunders . | |
| 4,286,489 | 9/1981 | DeLuca | 83/335 |
| 4,381,622 | 5/1983 | Spidell | 47/33 |
| 4,396,329 | 8/1983 | Wollar | 411/508 |
| 4,647,491 | 3/1987 | Ireland et al. | 47/33 |
| 4,702,034 | 10/1987 | Ferguson et al. | 47/33 |
| 4,755,091 | 7/1988 | Potucek et al. | 411/452 |

Primary Examiner—Neill R. Wilson
Attorney, Agent, or Firm—Luedeka, Hodges & Neely

[57] ABSTRACT

A lawn spike for anchoring objects, such as lawn edging, within a lawn utilizes a head and a pointed plastic shank shaped to enhance the strength of the shank and to cooperate with the ground, when operatively driven therein, to resist withdrawal of the spike therefrom. The shank includes a substantially cylindrical main section and a plurality of frusto-conical sections positioned about and spaced along the length of the main section so that each of the frusto-conical sections tapers toward the pointed end of the shank. The shank portion also includes a plurality of strengthening ribs formed with and extending longitudinally along the cylindrical periphery of the main section and which are also formed with so as to be joined to adjacent frusto-conical sections.

20 Claims, 1 Drawing Sheet

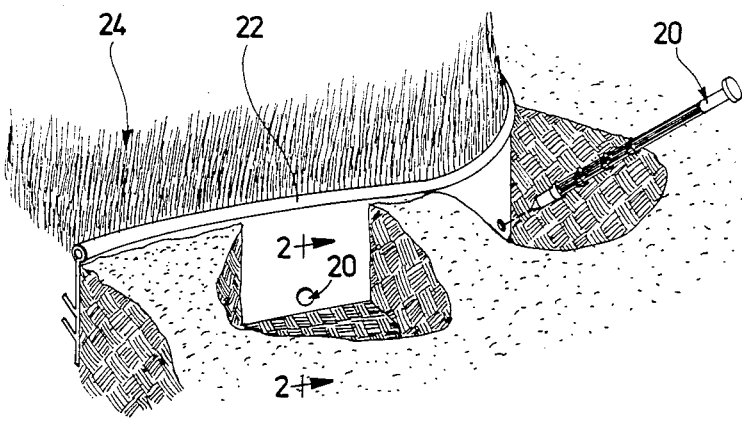
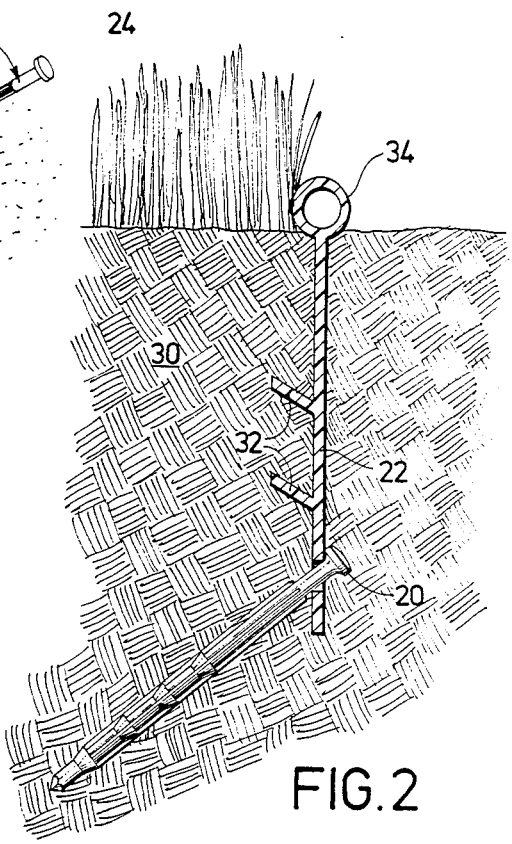
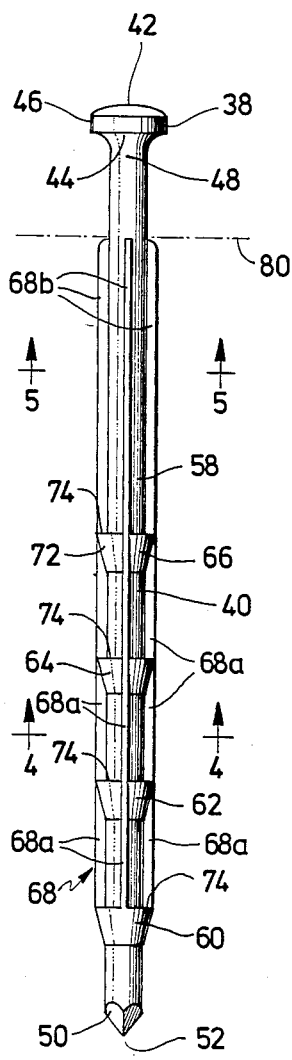
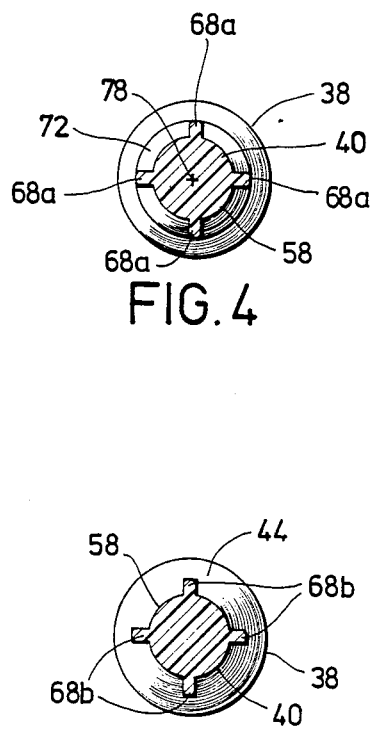
FIG. 1
FIG. 2
FIG. 3
FIG. 4
FIG. 5

4,846,655

SPIKE FOR LAWN EDGING OR THE LIKE

BACKGROUND OF THE INVENTION

This invention relates generally to lawn and garden accessories and relates more particularly to an anchoring spike or the like capable of being driven within the soil of a lawn.

It is known that in order to anchor objects, such as lawn edging or synthetic turf, within a lawn, a headed spike or stake can be driven through the object and into the soil of the lawn so that the object is tightly held between the head of the spike and the surface of the lawn. One such spike, shown and described in U.S. Pat. No. 4,381,622, includes a shank defining a plurality of annular grooves thereabout.

In order to anchor law edging within a lawn wherein the edging is of a type having a base portion positionable below the lawn surface and a trim portion positionable above the lawn surface, a headed spike is commonly directed through the edging and into the soil in a manner pinning the base portion to the lawn. Conventional spikes utilized for the purpose of anchoring such edging and, in particular, such spikes constructed of aluminum or having relatively smooth shanks are known to back or creep out of operative anchoring relationship with lawn edging over a period of time so that the edging is no longer securely pinned within the soil of the lawn. Such a backing out of the spikes is believed to be accelerated by, for example, the shifting of the lawn soil, such as may result during a frost heave, or a shifting of the edging by external means, such as may occur if the trim portion of the edging is struck with a lawn mower. It is desirable to provide a spike for anchoring lawn edging of the aforedescribed type which resists factors which may otherwise tend to back the spike out of the soil and edging and thereby loosen the edging from the soil.

It is an object of the present invention to provide a new and improved lawn spike for anchoring objects within a lawn.

Another object of the present invention is to provide such a lawn spike having an enhanced strength for resisting damage upon impact with an impact tool when operatively driven within the soil.

Still another object of the present invention is to provide such a lawn spike which resists withdrawal from the soil, once the spike has been operatively driven therein.

Yet still another object of the present invention is to provide such a spike which resists withdrawal from an object operatively anchored to the soil by means of the spike.

A further object of the present invention is to provide such a spike which is economical to construct and effective in operation.

SUMMARY OF THE INVENTION

This invention is embodied in a lawn spike having a shank and a head attached to the shank. The shank of the spike defines two opposite ends, one of which is pointed, and the head is attached to the shank end opposite the pointed end thereof. The shank includes a substantially cylindrical main section, a plurality of frusto-conical sections formed about and spaced along the length of the main section so that each of the frusto-conical sections tapers toward the pointed end portion of the shank, and means defining at least one strengthening rib associated with the main section and the rib-defining means. More specifically, each strengthening rib is formed with so as to extend along the cylindrical periphery of the main section and is formed with so as to be joined to adjacent frusto-conical sections to thereby enhance the strength of the shank.

BRIEF DESCRIPTION OF THE DRAWING FIGURES

FIG. 1 is a perspective view, shown partially cutaway, of a plurality of lawn spikes in accordance with the present invention shown operatively utilized for anchoring a section of lawn edging within a lawn.

FIG. 2 is a fragmentary cross-sectional view taken about on lines 2—2 on FIG. 1.

FIG. 3 is a side elevation view of a lawn spike illustrated in FIG. 1 but drawn to a slightly larger scale.

FIG. 4 is a cross-sectional view taken about on lines 4—4 of FIG. 3.

FIG. 5 is a cross-sectional view taken about on lines 5—5 of FIG. 3.

DETAILED DESCRIPTION OF THE ILLUSTRATED EMBODIMENT

Turning now to the drawings in greater detail and considering first FIGS. 1 and 2, there is illustrated a plurality of identical embodiments, each indicated 20, of a lawn spike in accordance with the present invention shown operatively utilized for securing a section of lawn edging, indicated 22, within a lawn 24. The edging 22 is partially embedded within the soil of the lawn 22 and the spikes 20 are oriented in an angular orientation through the edging 22 and embedded within the lawn soil.

With reference still to FIG. 2, the illustrated section of lawn edging 22 is comprised of an elongated, somewhat flat, thin base portion 30 and a pair of embossments 32 attached to so as to form an acute angle with the base portion 30 and so as to extend longitudinally of the base portion 30. Furthermore, a tubular portion 34 is attached to so as to extend along the top, as viewed in FIG. 2, of the base portion 30 to provide the top of the edging 22 with a rounded appearance. When operatively positioned within the lawn 22, the base portion 30 is embedded within the soil as shown in FIG. 2 and the tubular portion 34 is exposed to view. The section of lawn edging 22 is constructed of a durable polyethylene which provides the edging 22 with a degree of flexibility and which is capable of being punctured by the spike 20 when operatively driven therethrough.

With reference to FIG. 3, each spike 20 includes means defining a fillet head 38 and means defining a shank 40 operatively attached to the head 38. THe head 38 is shaped so as to define a somewhat rounded top surface 42, a flat bottom surface 44 and a cylindrical side surface 46. The shank 40 is elongated in shape and includes two opposite end portions 48 and 50, one end 50 of which is pointed so as to terminate in a tip 52. Furthermore, the shank end 48 is operatively joined to the bottom surface 38 of the head 38 so that the shank end portion 50 extends generally perpendicular to the plane of the bottom surface 44. Still further and as shown in FIG. 3, the shank end portion 48 is joined to the bottom surface 44 at a junction so that a generally concave, generally outwardly-directed surface 56 is defined thereabout.

With references to FIGS. 3 and 4, the shank 40 is shaped so as to include a substantially cylindrical main section 58, four frusto-conical sections 60, 62, 64, 66 positioned about the main section 58, and rib-defining means, indicated 68, including four strengthening ribs 68a extending between adjacent frusto-conical sections of the shank 40. The diameter of the main section 58 is substantially constant as a path is traced between the shank end portions 48 and 50, and the frusto-conical sections 60, 62, 64, 66 are uniformly spaced from one another along the length of the main section 58. In the illustrated spike embodiment 20, the frusto-conical sections are somewhat clustered along a preselected portion, indicated 70, of the length of main section 58, and the preselected portion 70 is arranged closer to the tip 52 of the shank 40 than to the head 38.

With reference still to FIG. 3, each frusto-conical section 60, 62, 64 or 66 is identical in shape to every other frusto-conical section and defines a generally conical or tapered surface 72 with its smaller end positioned against the surface of the main section 58 and having its larger end positioned farther from the tip 52 of the shank 40. In other words, the end of each frusto-conical section having the smaller radius is positioned closer to the tip 52 than is the end of the frusto-conical section having the larger radius. Furthermore, each frusto-conical section defines a generally flat surface 74 encircling the main section 58 and oriented generally within a radial plane of the main section 58 so as to generally face the head 38 of the spike 20.

In accordance with the present invention and with reference still to FIGS. 3 and 4, the strengthening ribs 68a are joined to and extend along the cylindrical periphery of the main section 58 and are joined to the frusto-conical sections which are positioned adjacent one another. In the illustrated spike embodiment 20 and as best viewed in FIG. 4, the four ribs 68a are regularly spaced about the surface of the main section 58, and each rib 68a extends longitudinally of the main section 58 so as to be oriented generally parallel to the longitudinal axis, indicated 78, of the main section 58.

With reference to FIGS. 3 and 5, the rib-defining means 68 further includes four strengthening ribs 68b extending from the frusto-conical section 66 positioned closest to the head 38 as measured along the length of the shank 40 toward the head 38 so as to terminate at end, located in a common radial plane, indicated 80, of the main section 58. Furthermore and as best shown in FIG. 3, each rib 68b extends along a major portion of the space defined between the frusto-conical section 66 and the head 38. Still further, the combined overall height of the rib-defining means 68 as measured radially of the shank 40 and from the cylindrical periphery of the main section 58 and the radius of the main section 58 is about equal to the maximum radius across the larger end of any frusto-conical section 60, 62, 64 or 66. Hence, the radially-outermost edge of the rib-defining means 68 is arranged along the surface of an imaginary cylinder containing the radially outermost edge of each frusto-conical section (i.e., the edge defined about the larger end of each frusto-conical section).

The illustrated spike 20 may be constructed of any of a number of suitable materials, such as a polypropylene co-polymer or some other plastic, which provides a shank 40 with a degree of resiliency to withstand impact when operatively driven within the ground and with sufficient stiffness to resist bending when driven as aforesaid. It has been found that polypropylene co-polymer renders the spike less brittle than does some other types of plastic, such as polyvinyl chloride, and is thereby preferred over such types of plastic. Preferably, the spike 20 is formed in a molding process so that the head 38, shank main section 58, and frusto-conical sections 60, 62, 64, 66, form a unitary structure.

For purposes of illustration, the following dimensions of the spike 20 are provided here as follows:

The overall length of the spike 20 is about 5.9 inches (15.1 cm). The thickness of the head 38 as measured along the side surface 46 is about 0.13 inches (0.33 cm), the diameter of the head 30 is about 0.5 inches (1.8 cm), the diameter of the shank main section 58 is about 0.25 inches (0.64 cm), the distance between the head 38 and the radial plane 80 at which the ribs 68b terminate is about 0.63 inches (1.6 cm), and the largest diameter of each frusto-conical section of the shank 40 is about 0.34 inches (0.9 cm). Hence, the overall length of the shank 40 in this example is at least twenty times the diameter of the main section 58.

With reference again to FIG. 1 and in order to utilize the spike 20 to anchor the section of lawn edging 22 within the lawn 24, the lawn 24 is trenched so as to form a generally vertically-oriented trench wall therealong and the edging 22 operatively positioned against a vertically-oriented wall of the formed trench. The tip 52 of the spike 20 is then held against the base portion 30 of the edging 22 and in an angular relationship therewith, and the head of the spike is struck with a mallet (not shown) or another suitable impact tool so that the tip 52 of the spike 20 punctures the base portion 30 and enters the soil behind the edging 22. The head 38 thereafter continues to be struck until the head 38 of the spike 20 engages the base portion 30. At that point, the formed trench is refilled with soil to completely embed the base portion 30 of the edging 22 and the spike 20. The edging 22 is thereby pinned within the soil by the spike 20. By positioning several spikes 20 through the edging 22 so that the spikes 20 are spaced along the length of the edging 22 as shown in FIG. 1, the securement of the edging 22 against the side 28 of the shelf 26 is thereby enhanced.

The aforedescribed combination of frusto-conical sections 60, 62, 64, 66 and rib-defining means 68 are believed to resist the withdrawal of the spike from the ground, once driven therein, in an effective manner and contribute to the strength of the shank 40. Such a resistance to withdrawal is believed to be due to the cooperation between the conical sections 60, 62, 64 and 66 and the ground once the spike 20 is operatively driven therein. For example, if forces are exerted upon the lawn edging 32 in a manner urging the edging 32 upwardly, the flat surfaces 74 of the frusto-conical sections 60, 62, 64 and 66 are urged against the soil surrounding the shank main section 58 in a direction generally perpendicular to the surfaces 74 so that withdrawal of the spike is opposed thereby. Furthermore and because the strength of the spike 20 is enhanced by the rib-defining means 68, the shank 40 of the spike 20 may be designed to possess a relatively narrow thickness yet possess sufficient strength to withstand impacts of a mallet or the like when operatively driven into the ground and to conserve material when constructed.

Another advantage provided by the spike 20 relates to its capacity to resist withdrawal from the section of lawn edging 22 once operatively driven therethrough. Such a capacity is believed to be due, at least in part, to the distance between the spike head 38 and ends of the ribs 68b which terminate at radial plane 80. More specifically, the spacing between the head 40 and radial plane 80 is at least as great as the thickness of the base portion 30 of the lawn edging 22 so that upon driving of the spike 20 through the edging 22 until the head 38 abuts the base portion 30 thereof, the base portion 30 is captured between the ends of the ribs 68b and the head 38.

It will be understood that numerous modifications and substitutions can be had to the aforedescribed embodiment without departing from the spirit of the invention. For example, although the spike 20 has been shown and described as including four frusto-conical sections spaced along its shank, a spike in accordance with the present invention may have an alternative number of frusto-conical sections. Accordingly, the aforedescribed embodiment is intended for purposes of illustration and not as limitation.

What is claimed is:

1. A lawn spike for anchoring lawn edging or the like in soil, said spike comprising:

means defining an elongated shank having two opposite end portions wherein one of said end portions is pointed; and means defining a head formed with the end portion of said shank opposite the pointed end portion thereof, said shank including a substantially cylindrical main section, a plurality of frusto-conical sections of substantially identical size formed about and spaced along the length of said main section so that each of said frusto-conical sections tapers toward the pointed end portion of said shank, and means defining at least one strengthening rib formed with said main section so as to extend along the cylindrical periphery of said main section and which is formed with adjacent frusto-conical sections to thereby enhance the strength of said shank, said rib being disposed along the length of the shank so that no portion of said rib is positioned between the point of said pointed end portion and the frusto-conical portion positioned closest to the point so that upon driving said pointed end portion into soil, the hole formed in the soil by said pointed end portion is increased in size to its largest diameter by the frusto-conical section positioned closest to the point of said pointed end portion.

2. The spike as defined in claim 1 wherein said rib-defining means includes a plurality of ribs formed with said main section and formed with adjacent frusto-conical sections as aforesaid and said plurality of ribs are regularly spaced about said cylindrical main section and extend linearly therealong.

3. The spike as defined in claim 1 wherein the frusto-conical section positioned closest to said head as measured along the length of said shank is spaced from said head and said rib-defining means includes another strengthening rib formed with said closest frusto-conical section and extending along the main section toward said head.

4. The spike as defined in claim 3 wherein said closest frusto-conical section is spaced from said head by about two-fifths of the overall length of said main section and said additional strengthening rib extends along a major portion of the space defined between said frusto-conical section and said head.

5. The spike as defined in claim 1 wherein said frusto-conical sections are clustered along a preselected portion of the length of said main section and said preselected portion is no greater than about three-fifths of the main section length and arranged closer to the pointed end portion of said shank than to the opposite shank end portion.

6. The spike as defined in claim 1 wherein said frusto-conical sections are spaced from said pointed end portion and from the opposite shank end portion and are spaced equidistant from one another as measured along the length of said main section.

7. The spike as defined in claim 1 wherein each frusto-conical section defines a relatively flat surface oriented in a radial plane of said main section so that said flat surface faces longitudinally of said main section and opposite the pointed end portion of said shank.

8. The spike as defined in claim 1 wherein the distance obtained by combining the height of said strengthening rib as measured radially of said shank from the cylindrical periphery of said main section and the radius of said main section is about equal to the maximum radius of each frusto-conical section.

9. The spike as defined in claim 1 wherein said head is formed with said shank at the shank end opposite the pointed end thereof at a junction being of such shape so that a generally concave, outwardly-opening surface is defined by said junction.

10. The spike as defined in claim 1 wherein said frusto-conical sections and said rib-defining means are integrally formed with one another out of plastic and to said main section so that said main section, rib-defining means and frusto-conical sections form a unitary plastic structure.

11. A lawn spike for anchoring lawn edging or the like into soil, said spike comprising a body including:

a head portion; and an elongated shank portion joined to so as to extend from said head portion and terminating at a pointed end, said shank portion shaped so as to define a main, generally cylindrical section extending between the head portion and the pointed end, means defining a plurality of strengthening ribs extending linearly along the length of said main section and a plurality of frusto-conical sections of substantially identical size positioned about and spaced along the length of said main section so that each of said frusto-conical sections taper toward the pointed end of said shank portion, the largest diameter of each frusto-conical section being at least as great as the largest diameter of a cross section of said spike containing said strengthening ribs and said ribs being disposed along the length of the shank portion so that no portion of said ribs is positioned between said pointed end and the frusto-conical section positioned closest to said pointed end so that upon driving the pointed end of said shank portion into soil, the hole formed in the soil by the pointed end is increased in size to its largest diameter by the frusto-conical section positioned closest to the pointed end, said rib-defining means, frusto-conical sections and main sections being integrally formed with one another to enhance the strength of said shank.

12. The spike as defined in claim 11 wherein said defined ribs are spaced circumferentially about said main section.

13. The spike as defined in claim 11 wherein there are at least three of said frusto-conical sections which are positioned about said main section and each of said three frusto-conical sections are clustered along a preselected portion of the length of said main section wherein said preselected portion is located closer to said pointed end of said shank portion than to said head end.

14. The spike as defined in claim 11 wherein the diameter of said main section is relatively small in comparison to the overall length of said shank.

15. The spike as defined in claim 14 wherein the overall length of said shank is at least twenty times as great as the diameter of said main section.

16. In combination:
a section of lawn edging having a base portion positionable against soil; and
a lawn spike for anchoring the section of lawn edging in the soil including an elongated shank having two opposite end portions wherein one of said end portions is pointed, a head attached to the end portion of said shank opposite the pointed end portion thereof, and said shank including a substantially cylindrical main section, a plurality of frusto-conical sections of substantially identical size positioned about and spaced along the length of said main section so that each of said frusto-conical sections tapers toward the pointed end portion of said shank, and means defining at least one strengthening rib formed with said main section so as to extend linearly along the cylindrical periphery of said main section and which is formed with adjacent frusto-conical sections to thereby enhance the strength of said shank, said rib being disposed along the length of the shank so that no portion of said rib is positioned between the point of said pointed end portion and the frusto-conical portion positioned closest to the point so that upon driving the pointed end portion into soil, the hole formed in the soil by the pointed end portion is increased in size to its largest diameter by the frusto-conical section positioned closest to the pointed end portion, said base portion of lawn edging and said lawn spike cooperable with one another so that when said lawn spike is driven point-end-first through said base portion of said lawn edging and into the soil of a lawn, the lawn edging is secured between the soil and said head of said spike.

17. The combination of claim 16 wherein said base portion of said lawn edging is relatively thin and adapted to be punctured by the pointed end of said spike when said spike is operatively driven point-end-first into said base portion.

18. The combination of claim 16 wherein the frusto-conical section positioned closest to said head as measured along the length of said shank is spaced from head by an appreciable amount and said rib-defining means includes at least one strengthening rib formed with said closest frusto-conical section, extending longitudinally along the main section toward said head and terminating at a rib end spaced from said head a distance which is about equal to the thickness of the base portion at the base portion location through which said spike is adapted to be driven so that upon operatively driving said spike through said base portion until said head abuts said base portion, said base portion is positioned between said head and said rib end.

19. The combination of claim 18 wherein said rib-defining means include a plurality of strengthening ribs joined to said closest frusto-conical section to said head and terminating at rib ends located in a common radial plane of said main section and spaced from said head a distance which is greater than the thickness of said base portion location through which said spike is adapted to be driven so that upon operatively driving said spike through said base portion until said head abuts said base portion, said base portion is captured between said head and said rib ends.

20. A lawn spike for anchoring lawn edging or the like in soil, said spike comprising:
means defining an elongated shank having two opposite end portions wherein one of said end portions is pointed;
means defining a head formed with the end portion of said shank opposite the pointed end portion thereof, a plurality of frusto-conical sections of substantially identical size formed about and spaced along the length of said main section so that each of said frusto-conical sections tapers toward the pointed end portion of said shank, said frusto-conical section being clustered along a preselected portion of the length of said main section which is no greater than about three-fifths of the main section length and which is disposed along the main section so that the frusto-conical section positioned closest to said head as measured along the length of said shank is spaced from said head by an amount equal to about two-fifths of the overall length of said main section; and
means defining a plurality of strengthening ribs formed with said main section so as to extend linearly along the cylindrical periphery of said main section, the largest diameter of each frusto-conical section being at least as great as the largest diameter of a cross section of said spike containing said strengthening ribs and said ribs being disposed along the length of the shank portion so that no portion of said ribs is positioned between the point of said pointed end portion and the frusto-conical section positioned closest to said point so that upon driving the pointed end portion into the soil, the hole formed in the soil by said pointed end portion is increased to its largest diameter by the frusto-conical section positioned closest to the point of said pointed end portion.

* * * * *